US009860781B2

(12) United States Patent
Cui et al.

(10) Patent No.: US 9,860,781 B2
(45) Date of Patent: Jan. 2, 2018

(54) DYNAMIC BUNDLING OF UPLINK DATA SESSIONS BASED UPON NETWORK SIGNALING CONDITIONS AND APPLICATION INTERACTIVITY STATES

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 189 days.

(21) Appl. No.: 14/520,036

(22) Filed: Oct. 21, 2014

(65) Prior Publication Data
US 2016/0113030 A1 Apr. 21, 2016

(51) Int. Cl.
*H04L 12/28* (2006.01)
*H04W 28/02* (2009.01)
*H04W 48/06* (2009.01)
*H04W 72/04* (2009.01)
(Continued)

(52) U.S. Cl.
CPC ......... *H04W 28/0215* (2013.01); *H04L 47/24* (2013.01); *H04W 28/0231* (2013.01); *H04W 28/0284* (2013.01); *H04W 48/06* (2013.01); *H04W 72/0413* (2013.01); *H04L 47/823* (2013.01); *H04W 72/0486* (2013.01)

(58) Field of Classification Search
CPC ..... H04W 24/02; H04W 24/10; H04W 48/06; H04W 36/245; H04W 36/30; H04W 28/0247; H04L 43/026

USPC ......................................... 370/230, 231, 329
See application file for complete search history.

(56) References Cited

U.S. PATENT DOCUMENTS

| 5,943,327 A | 8/1999 | Mademann |
| 6,115,547 A | 9/2000 | Ghatate |
| 8,108,757 B2 | 1/2012 | Ahn |

(Continued)

FOREIGN PATENT DOCUMENTS

| AU | 2009282091 B2 | 2/2014 |
| CN | WO2014166030 | 10/2014 |

(Continued)

OTHER PUBLICATIONS

Xu, "Identifying diverse usage behaviors of smartphone apps," Proceedings of the 2011 ACM SIGCOMM conference on Internet measurement conference, ACM, 2011.

(Continued)

*Primary Examiner* — Alex Skripnikov
*Assistant Examiner* — Lionel Preval
(74) *Attorney, Agent, or Firm* — Hartman & Citrin LLC

(57) ABSTRACT

Concepts and technologies are described herein for dynamic bundling of uplink data sessions based upon network signaling conditions and application interactivity states. According to one aspect disclosed herein, a mobile device can receive signaling load information from a base station. The mobile device can determine a characteristic of an uplink data flow request. The mobile device can determine whether the uplink data flow request should be bundled based, at least in part, upon the signaling load information and the characteristic of the uplink data flow request.

15 Claims, 6 Drawing Sheets

(51) Int. Cl.
H04L 12/851 (2013.01)
H04L 12/911 (2013.01)

(56) References Cited

U.S. PATENT DOCUMENTS

| | | | |
|---|---|---|---|
| 8,345,605 B2 | 1/2013 | Shen et al. | |
| 8,457,044 B2 | 6/2013 | Song | |
| 8,537,674 B2 | 9/2013 | Brisebois et al. | |
| 8,553,591 B2 | 10/2013 | Jiang et al. | |
| 8,576,719 B2 | 11/2013 | Dinan et al. | |
| 8,578,035 B2 | 11/2013 | Miklos | |
| 8,578,046 B2 | 11/2013 | Crockett et al. | |
| 8,588,253 B2 | 11/2013 | Dyck | |
| 8,724,504 B2 | 5/2014 | Gao et al. | |
| 2005/0009527 A1 | 1/2005 | Sharma | |
| 2005/0239435 A1 | 10/2005 | Ikeda et al. | |
| 2006/0123052 A1 | 6/2006 | Robbin et al. | |
| 2006/0206890 A1 | 9/2006 | Shenfield et al. | |
| 2007/0168417 A1 | 7/2007 | Swanburg et al. | |
| 2009/0124249 A1 | 5/2009 | Young et al. | |
| 2009/0175214 A1 | 7/2009 | Sfar | |
| 2009/0268635 A1 | 10/2009 | Gallagher | |
| 2010/0284356 A1 | 11/2010 | Ray et al. | |
| 2011/0087975 A1 | 4/2011 | Karsten | |
| 2011/0128922 A1 | 6/2011 | Chen et al. | |
| 2012/0106456 A1 | 5/2012 | Jin | |
| 2012/0120799 A1* | 5/2012 | Brisebois | H04W 4/001 370/231 |
| 2012/0120844 A1* | 5/2012 | Prechtl | H04W 48/10 370/253 |
| 2012/0176998 A1* | 7/2012 | Muellner | H04W 52/343 370/329 |
| 2012/0207070 A1 | 8/2012 | Xu et al. | |
| 2012/0213192 A1 | 8/2012 | Kiyoshima | |
| 2012/0224536 A1 | 9/2012 | Hahn | |
| 2012/0281535 A1 | 11/2012 | Day | |
| 2012/0281566 A1 | 11/2012 | Pelletier | |
| 2012/0287869 A1 | 11/2012 | Xi | |
| 2013/0017819 A1 | 1/2013 | Wang et al. | |
| 2013/0077541 A1 | 3/2013 | Lin et al. | |
| 2013/0114401 A1 | 5/2013 | Martin et al. | |
| 2013/0121349 A1 | 5/2013 | Crockett et al. | |
| 2013/0182624 A1 | 7/2013 | Sun et al. | |
| 2013/0322238 A1* | 12/2013 | Sirotkin | H04W 28/0247 370/230 |
| 2013/0329551 A1 | 12/2013 | Brisebois et al. | |
| 2013/0329637 A1 | 12/2013 | Kodali et al. | |
| 2013/0336223 A1 | 12/2013 | Huang et al. | |
| 2013/0343357 A1 | 12/2013 | Lindoff et al. | |
| 2014/0032730 A1 | 1/2014 | Fall et al. | |
| 2014/0044027 A1 | 2/2014 | Beale | |
| 2014/0126441 A1 | 5/2014 | Rai et al. | |
| 2014/0126551 A1 | 5/2014 | Nammi | |
| 2014/0146763 A1 | 5/2014 | Khay-Ibbat et al. | |
| 2014/0219248 A1 | 8/2014 | Reddiboyana | |
| 2015/0230276 A1 | 8/2015 | Jung | |

FOREIGN PATENT DOCUMENTS

| | | |
|---|---|---|
| EP | 2320692 | 6/2013 |
| GB | 2477785 | 8/2011 |
| JP | 2009253981 | 10/2009 |
| JP | 2014014123 | 1/2014 |
| WO | WO 2012127591 | 9/2012 |
| WO | WO2013009892 A1 | 1/2013 |

OTHER PUBLICATIONS

Office Action dated Oct. 20, 2015 in U.S. Appl. No. 14/520,004.
Raymond et al., "PGN3—Store and Forward Approach to Dynamic Networks," retrieved at http://cs.gmu.edu/~yhwang1/INFS612/Sample_Projects/2009_Fall_PGN_3_final_report.pdf on Oct. 21, 2014.
Riveras et al., "Obtaining More Realistic Cross-Layer QoS Measurements: A VoIP over LTE Use Case," Journal of Computer Networks and Communications, vol. 2013, Hindawi.
Beard et al., "QoS and Channel Aware Packet Bundling for VoIP and Data Traffic in Multi-Carrier Cellular Networks," IEEE 22$^{nd}$ International Teletraffic Congress, 2010, IEEE.
Lee et al., "PhonePool: On Energy-efficient Mobile Network Collaboration with Provider Aggregation," 2014.
Banawan, "Comparative study between Mobile WiMAX (IEEE802.16e based) and 3GPP LTE," 2010.
Sadiwala, "Convergence Towards Next Generation Wireless Networks," IOSR Journal of Electrical and Electronics Engineering 4.4 (2013): 1-13.
Srivatava, "Tutorial on Functionality and Performance," Diss. University of Texas at Arlington, 2010.
Ungureanu, "Flexible and Programmable Evolved Packet Core: A New SDN-based Model," Diss. TU Delft, Delft University of Technology, 2014.
U.S. Appl. No. 14/520,004, filed Oct. 21, 2014.
Office Action dated Feb. 10, 2016 in U.S. Appl. No. 14/520,004.
Rivas et al., "Obtaining More Realistic Cross-Layer QoS Measurements: A VoIP over LTE Use Case," Journal of Computer Networks and Communications, vol. 2013, Hindawi.
U.S. Office Action dated Dec. 26, 2012 in U.S. Appl. No. 12/947,212.
U.S. Notice of Allowance dated May 14, 2013 in U.S. Appl. No. 12/947,212.
U.S. Office Action dated Jan. 30, 2014 in U.S. Appl. No. 13/965,798.
U.S. Notice of Allowance dated Jun. 16, 2014 in U.S. Appl. No. 13/965,798.

* cited by examiner

DYNAMIC BUNDLING OF UPLINK DATA SESSIONS BASED UPON NETWORK SIGNALING CONDITIONS AND APPLICATION INTERACTIVITY STATES

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for dynamic bundling of uplink data sessions based upon network signaling conditions and application interactivity states. According to one aspect disclosed herein, a mobile device can receive signaling load information from a base station. The mobile device can determine a characteristic of an uplink data flow request. The mobile device can determine whether the uplink data flow request should be bundled based, at least in part, upon the signaling load information and the characteristic of the uplink data flow request.

In some embodiments, the mobile device can receive the signaling load information from the base station via a cell broadcast message. The cell broadcast message can include a system information block ("SIB"). The cell broadcast message alternatively can include a short messaging service ("SMS") message.

In some embodiments, the characteristic of the uplink data flow request includes an interactive characteristic or a non-interactive characteristic. In these embodiments, the mobile device can determine that the uplink data flow request should not be bundled if the characteristic of the uplink data flow request includes an interactive characteristic. The mobile device can determine that the uplink data flow request should be bundled if the characteristic of the uplink data flow request includes a non-interactive characteristic. The mobile device can send, to the base station, the uplink data flow request in an uplink bundle that includes a further uplink data flow request.

In some embodiments, the mobile device can determine whether a cell associated with the base station is congested based upon the signaling load information. If the mobile device determines that the cell associated with the base station is congested based upon the signaling load information, the mobile device can determine whether the uplink data flow request is associated with an interactive application. If the mobile device determines that the uplink data flow request is associated with an interactive application, the mobile device can send the uplink data flow request to the base station. If the mobile device determines that the uplink data flow request is associated with a non-interactive application, the mobile device can send the uplink data flow request to a bundle cache and initiate a bundle timer. If the mobile device determines that the uplink data flow request is associated with a non-interactive application, the mobile device also can determine whether the bundle timer has expired. If the mobile device determines that the bundle timer has expired, the mobile device can reset the bundle timer and can send the uplink data flow request to the base station. If the mobile device determines that the bundle timer has not expired, the mobile device can determine whether a new user request has been received. If the mobile device determines that a new user request has not been received, the mobile device can send, to the base station, an uplink bundle that includes a further uplink data flow request included in the bundle cache to the base station. If the mobile device determines that a new user request has been received, the mobile device can reset the bundle timer and can send the uplink data flow request to the base station.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
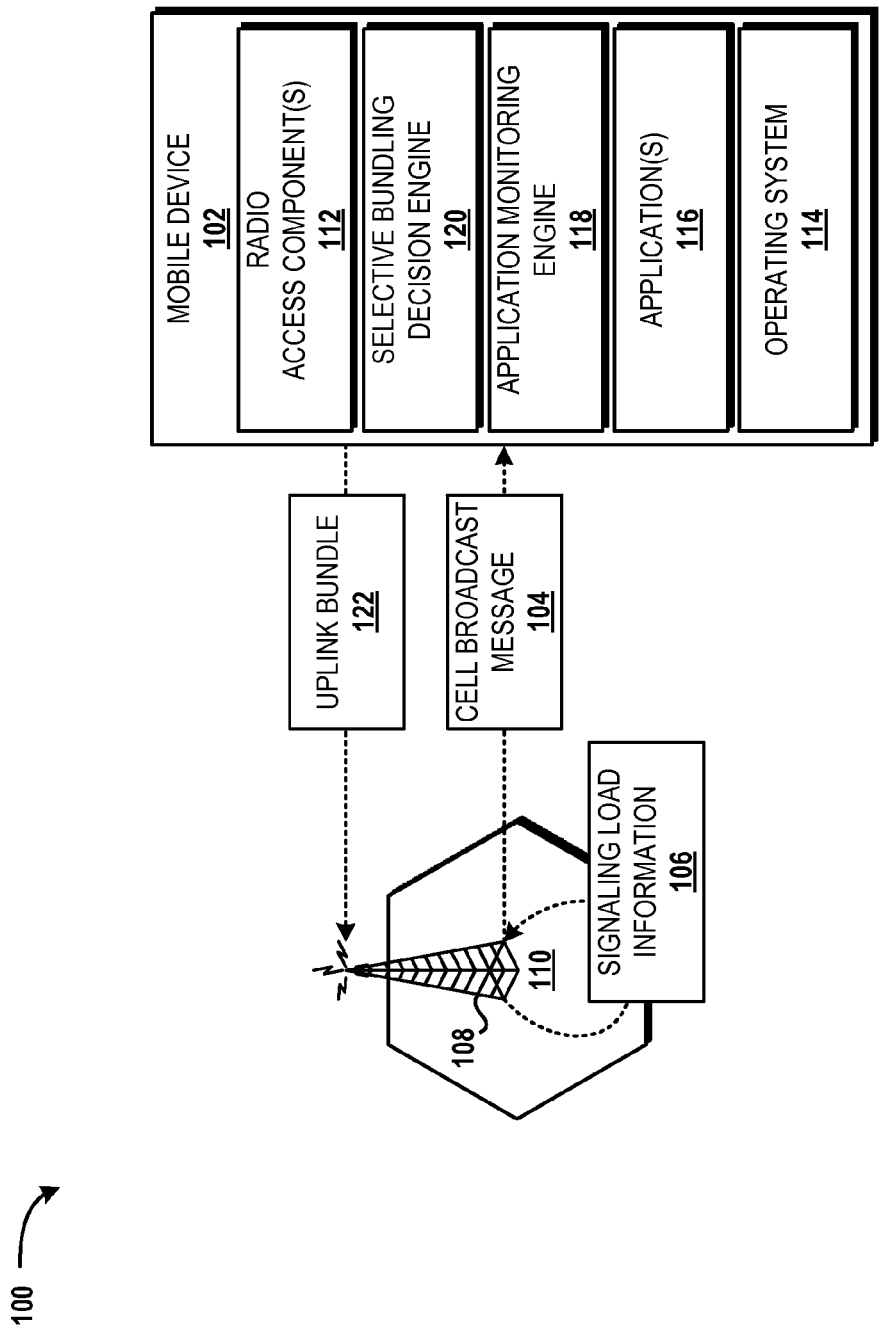
FIG. 1 is a block diagram illustrating aspects of an illustrative operating environment for various concepts disclosed herein.

Wireless data traffic has been growing at a very fast pace and the trend is still continuing. Beyond data traffic volume growth, there has been an even more aggressive growth in data signaling load. Among all the signaling messages/procedures on cellular networks, radio access network ("RAN") signaling procedures have caused the most growth and impact. This is due to complicated radio resource sharing techniques required to conserve resources occupied by various users and services.

The majority of RAN signaling events are for connection setup and state transitions (also known as "channel switching"). Whenever there is data to be sent, a mobile device (also known as user equipment ("UE"), or "handset") can send a request to a base station requesting resources to handle the data. Once the data payload is sent or received, multiple "inactivity" timers can start at the base station, which controls the admission and channel switching of each mobile device the base station serves, and upon expiration will transition the mobile device from connected mode to idle mode. The transition from connected mode to idle mode constitutes channel switching. To achieve resource efficiency, such timers can be set to short values (cumulatively, approximately 12-16 seconds). For this reason, a mobile device is often quickly moved to an idle state after completion of a current data session (e.g., a download or an upload).

Modern mobile devices, such as smartphones, allow users to download and use many data applications simultaneously. However, each data application can operate independently from a radio network perspective. In today's mobile device design, there is no intelligence to bundle closely spaced data payloads. Small packets, which may be stacked and sent in one single connection, are instead sent individually. As a result, a substantial amount of signaling events are generated, which leads to increased base station processing load, which in turn, might result in decreased performance and perceived network quality.

Concepts and technologies are described herein for dynamic bundling of uplink data sessions based upon network signaling conditions and application interactivity states. According to one aspect disclosed herein, a mobile device utilizes network signaling load information to adaptively and selectively bundle uplink data flow requests.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across radio access technologies and radio frequencies utilizing cell broadcast messages will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102 that is configured to connect to and communicate with one or more radio access networks ("RANs") for voice and/or data communications between the mobile device 102 and one or more other mobile devices, computers, servers, networking devices, and/or other networks (not shown). The mobile device 102 is also configured to receive a cell broadcast message 104 from one or more RANs. The cell broadcast message 104 can include information regarding network signaling load conditions of one or more RANs to which the mobile device 102 is capable of connecting.

In the illustrated example, the mobile device 102 receives the cell broadcast message 104 including signaling load information 106 collected by a base station 108 that is operating within a cell 110 of a RAN. As used herein, a "signaling load" refers to a load created by one or more signaling operations between one or more of RANs and the mobile device 102 via one or more signaling bearers. Moreover, a "signaling load" specifically excludes any traffic load associated with one or more traffic bearers. For example, an LTE RAN base station can monitor and report the utilization of physical uplink and downlink control channels ("PUCCH" and "PDCCH") according to the percentage of time these resources are idle and available over a specified time interval.

In some embodiments, the signaling load information 106 includes historic network signaling load information. As used herein, "historic network signaling load information" can include signaling load information obtained based upon network signaling load experienced by the base station 108 in the past or otherwise in non-real-time. In some embodiments, historic network signaling load information is utilized by the mobile device 102 to identify one or more network signaling load trends over a specified period of time. This trending network signaling load information can be useful to the mobile device 102 to predict times during which network signaling load is favorable or not to support communications between the mobile device 102 and one or more RANs.

In some other embodiments, the signaling load information 106 includes current network signaling load information. As used herein, "current network signaling load data" can include network signaling load data that is obtained based upon a network signaling load experienced by the base station 108 in real-time or near real-time. Real-time, in this context, is the actual time during which a network signaling load is experienced by the base station 108. Near real-time, in this context, is the actual time during which a network signaling load is experienced by the base station 108 plus a delay on the order of seconds, minutes, or any order of magnitude thereof, for example.

What constitutes near-real time network signaling load information versus historic network signaling load information can be defined by a service provider that provides service via the base station 108. It should be understood that real-time network signaling load information associated with a real-time network signaling load of the base station 108, and near real-time network signaling load information associated with a near real-time network signaling load of the base station 108 might be received by the mobile device 102 with delay caused by latency and/or other network phenomena. Moreover, this delay may increase with the additional time needed to generate the cell broadcast message 104 including the signaling load information 106, and to send the cell broadcast message 104 to the mobile device 102.

As used herein, a "cell" refers to a geographical area that is served by one or more base stations operating within a RAN. As used herein, a "base station" refers to a radio receiver and/or transmitter (collectively, transceiver) that is/are configured to provide a radio/air interface by which one or more mobile devices, such as the mobile device 102, can connect to a network. Accordingly, a base station is intended to encompass one or more base transceiver stations ("BTSs"), one or more Node Bs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to/from a network.

The mobile device 102 may be a cellular phone, a feature phone, a smartphone, a mobile computing device, a tablet computing device, a portable television, a portable video game console, or any other computing device that is configured to connect to and communicate with one or more RANs via one or more radio access components 112. In some embodiments, the mobile device 102 includes an integrated or external radio access component that facilitates wireless communication with one or more RANs. The radio access component may be a cellular telephone that is in wired or wireless communication with the mobile device 102 to facilitate a tethered data connection to one or more RANs. Alternatively, the access component includes a wireless transceiver configured to send data to and receive data from one or more RANs and a universal serial bus ("USB") or another communication interface for connection to the mobile device 102 so as to enable tethering. In any case, the mobile device 102 can wirelessly communicate with one or more RANs over a radio/air interface in accordance with one or more radio access technologies ("RATs"). The mobile device 102 may also initiate, receive, and/or maintain voice calls with one or more other voice-enabled telecommunications devices such as other mobile devices or landline devices (not shown). The mobile device 102 may also exchange Short Message Service ("SMS") messages, Multimedia Message Service ("MMS") messages, email, and/or other messages with other devices (not shown).

As used herein, a RAN may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAN can utilize various channel access methods (which may or may not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the mobile device 102. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

A RAN can be part of one or more mobile telecommunications networks. As used herein, a mobile telecommunications network includes one or more RANs and a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices, such as the radio access component(s) 112 of mobile device 102. Moreover, a mobile telecommunications network can provide a connection to an internet or other WAN so that the mobile device 102 can access internet content such as websites, streaming media, online video games, downloadable content, and the like.

As mentioned above, the cell 110 may be part of the same RAN or any number of different RANs. In some instances, the mobile device 102 is capable of simultaneous connection to the cell 110. As such, in some embodiments, the mobile device 102 is a multi-mode device. The cell 110 can be any shape and can have any dimensions. Thus, the illustrated embodiment should be understood as being illustrative, and should not be construed as being limiting in any way.

The cell broadcast message 104 can include any message that is capable of being sent to the mobile device 102 from a base station over a radio/air interface. The cell broadcast message 104 can be sent to the mobile device 102 using any physical, transport, and/or logical channels. These channel types are generally known and therefore are not described in greater detail herein.

In some embodiments, the cell broadcast message 104 is or includes a System Information Block ("SIB"). In some other embodiments, the cell broadcast message 104 is included in a SIB that contains other information. The SIB may be a new SIB configured to include signaling load information such as the signaling load information 106. Alternatively, the SIB may be an existing SIB that has been modified to include signaling load information.

In some embodiments, the cell broadcast message 104 is an SMS message. In these embodiments, the base station 108 can send the cell broadcast message 104 to the mobile device 102, and potentially to one or more other mobile devices that are connected to the base station 108 or otherwise operating within the cell 110, via SMS Cell Broadcast ("SMS-CB"). Alternatively, in these embodiments, the base station 108 can send the cell broadcast message 104 to the mobile device 102 via SMS Peer-to-Peer ("SMPP"). The cell broadcast message 104 may be sent to the mobile device 102 via other messaging services including, but not limited to, MMS, Wireless Application Protocol ("WAP") push message, Unstructured Supplementary Service Data ("USSD"), or any combination thereof. It should be understood that network elements, such as Short Message Service Centers ("SMSCs"), Multimedia Message Service Centers ("MMSCs"), WAP servers, USSD servers, and the like, that support the aforementioned messaging services are not illustrated merely for ease of description, however, these and/or other network elements can be utilized to support the aforementioned delivery methods of the cell broadcast message 104. In the illustrated example, the mobile device 102 receives the cell broadcast message 104 from the base station 108. Alternatively or additionally, the mobile device 102 can receive one or more cell broadcast messages from any number of base stations (other base stations not illustrated).

The illustrated mobile device 102 also includes an operating system 114, one or more applications 116, an application monitoring engine 118, and a selective bundling decision engine 120. The operating system 114 is a program for controlling the operation of the mobile device 102. The operating system 114 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The application(s) 116 can execute on top of the operating system 114. The application(s) 116 can include, for example, one or more presence applications, one or more visual voice mail applications, one or more messaging applications, one or more text-to-speech and/or speech-to-text applications, one or more add-ons, one or more plug-ins, one or more email applications, one or more music applications, one or more video applications, one or more camera applications, one or more location-based service applications, one or more power conservation applications, one or more game applications, one or more productivity applications, one or more entertainment applications, one or more enterprise applications, any other application that is capable of uploading data packets to the base station 108, combinations thereof, and the like.

The application monitoring engine 118 monitors operations performed, at least in part, by the application(s) 116 to determine characteristics of data sessions created by or otherwise utilized by the application(s) 116. In other words, the application monitoring engine 118 can determine whether the application(s) 116 exhibit interactive or non-interactive characteristics. The application monitoring engine 118 can monitor user input to and uplink data flow requests by the application(s) 116. The application monitoring engine 118 can categorize an uplink data flow request according to a level of interactivity considering the user input(s) that preceded the data flow request. For example, if an uplink data flow request closely follows user input (e.g., <100 milliseconds after the user input), then the application monitoring engine 118 can determine the uplink data flow request to be interactive. If, for example, audio and/or video playback by one or more of the application(s) 116 is in progress, then the application monitoring engine 118 can determine the uplink data flow request to be interactive. If, for example, an uplink data flow request does not closely follow user input (e.g., >100 milliseconds after the user input) or the uplink data flow request does not include audio and/or video playback, then the application monitoring engine 118 can determine the uplink data flow request to be non-interactive.

An application can be considered "interactive" if, for example, a user has requested something via the application and the user is waiting for a response from the application. An application can be considered "interactive" if, for example, an uplink request is associated/correlated with an input user interface activity (e.g., in-hand sensing, touchscreen or microphone input) and an output user interface (e.g., display or speaker) is in a "ready for output" state like display or speaker on.

An application can be considered "non-interactive" if, for example, the application has requested something autonomously without any user input or user awareness. The uplink request is associated/correlated with a mechanized activity (e.g. email synch request, location report, and/or the like when the mobile device 102 is not in-hand) and the output user interface (e.g., display or speaker) is in a "dormant" state like display off or speaker off. In this case, the user is not aware of or waiting for data so the request can be bundled.

In some embodiments, the application monitoring engine 118 can categorize uplink data flow request based, at least in part, upon the type of application that generated the data flow request. The application type can be defined by policy or pre-configured rules. For example, uplink data flow requests generated by a voice application can be categorized as interactive, whereas uplink data flow requests generated by a web browser can be categorized as non-interactive. It should be understood that the application monitoring engine 118 can categorize an uplink data flow request based upon other interactive and non-interactive characteristics, historic categorization, policies, rules, and the like.

The selective bundling decision engine 120 can receive uplink data flow requests and associated categorizations from the application monitoring engine 118. The selective bundling decision engine 120 can determine whether the uplink data flow requests should be bundled in an uplink bundle 122. The selective bundling decision engine 120 can bundle two or more data flow requests when the signaling load information 106 included in the cell broadcast message 104 indicates that the network signaling load of the RAN associated with the base station 108 is congested. The selective bundling decision engine 120 can bundle uplink data flow requests that are categorized as non-interactive, and can provide the uplink bundle 122 that includes two or more bundled uplink data flow requests to the base station 108.

For non-interactive applications, the time between user input and the start of data flow is an indication that the user is not interacting with the mobile device 102, the user is not waiting for data, and the user is not likely to provide further input. In this case, the selective bundling decision engine 120 can withhold uplink data flow requests for a pre-defined time period, which is monitored by a bundling timer, to allow other uplink data flow requests to stack up in a queue. In some embodiments, the selective bundling decision engine 120 can bundle uplink data flow request based upon Quality of Service ("QoS") and/or Class of Service ("CoS") parameters. The bundling timer can be adjusted according to network signaling load conditions. The bundling timer can be set per QoS/CoS or a group of QoS/CoS parameters. Additional details regarding operations of the selective bundling decision engine 120 are described below with reference to FIG. 3.

It should be understood that some implementations of the operating environment 100 may include additional functionality or include less functionality than described above.

Thus, the illustrated embodiment should be understood as being illustrative, and should not be construed as being limiting in any way.

Figure 2:
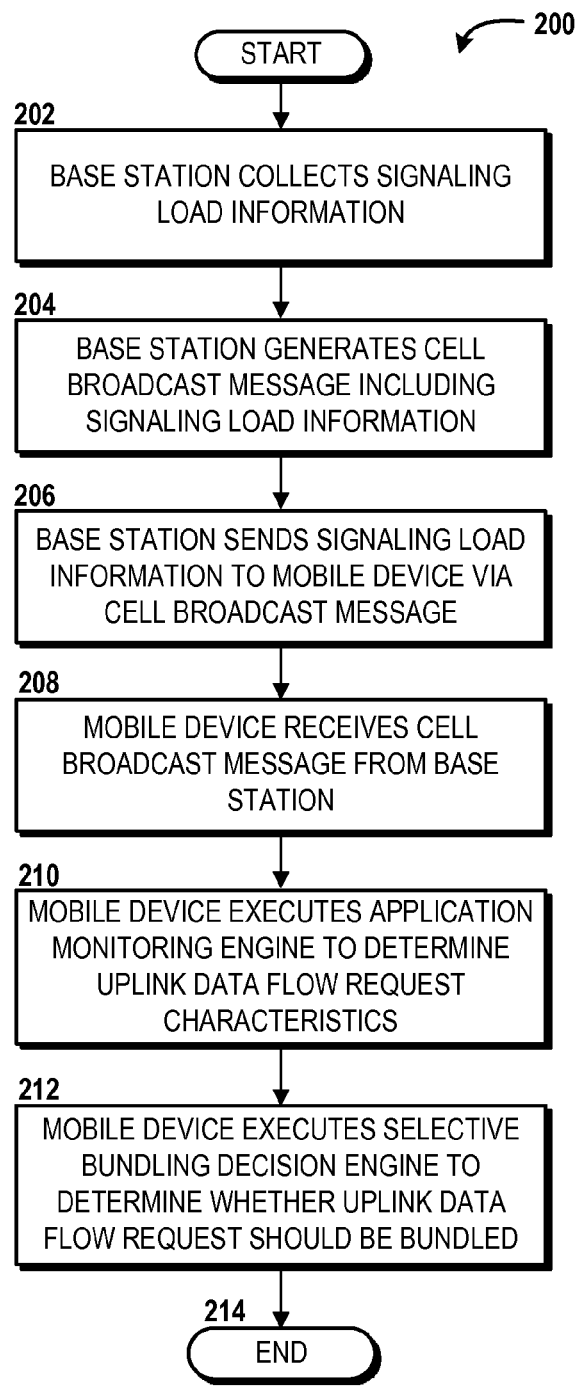
FIG. 2 is a flow diagram illustrating aspects of a method for dynamic bundling of uplink data sessions based upon network signaling conditions and application interactivity states, according to an illustrative embodiment.

Turning now to FIG. 2, a flow diagram illustrating aspects of a method 200 for dynamic bundling of uplink data sessions based upon network signaling conditions and application interactivity states will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 includes operations performed by the base station 108 and the mobile device 102. The method 200 is described with additional reference to FIG. 1. The method 200 begins and proceeds to operation 202, where the base station 108 collects the signaling load information 106. The signaling load information 106 can include signaling utilization information associated with the utilization of signaling resources available to the base station 108. In some embodiments, the base station 108 collects signaling utilization information, and then calculates a composite signaling load level of the base station 108 for inclusion in the cell broadcast message 104. A composite signaling load level can be calculated utilizing any signaling load calculation method, which, for example, may be selected by or for a service provider operating the base station 108 based upon the needs of the service provider.

From operation 202, the method 200 proceeds to operation 204, where the base station 108 generates the cell broadcast message 104 including at least a portion of the signaling load information 106 collected at operation 202. From operation 204, the method 200 proceeds to operation 206, where the base station 108 sends the cell broadcast message 104 to one or more mobile devices, including the mobile device 102.

From operation 206, the method 200 proceeds to operation 208, where the mobile device 102 receives the cell broadcast message 104 from the base station 108. From operation 208, the method 200 proceeds to operation 210, where the mobile device 102 executes, via one or more processors (best shown in FIG. 5), the application monitoring engine 118 to monitor one or more of the applications 116 and to determine characteristics of one or more uplink data flow requests performed by the application(s) 116.

Figure 3:
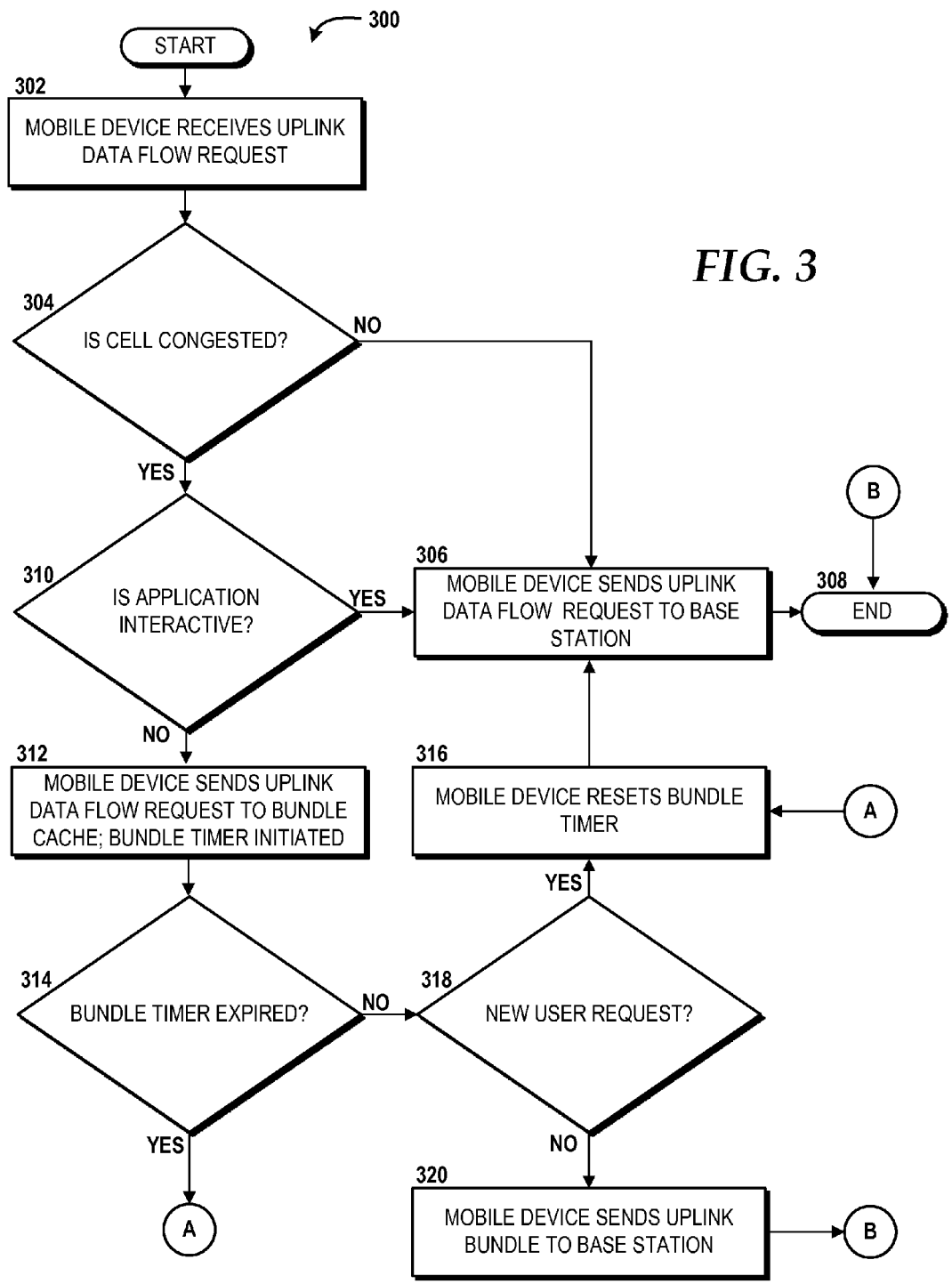
FIG. 3 is a flow diagram illustrating aspects of a method for dynamic bundling of uplink data sessions based upon network signaling conditions and application interactivity states, according to an illustrative embodiment.

From operation 210, the method 200 proceeds to operation 212, where the mobile device 102 executes, via one or more processors, the selective bundling decision engine 120 to determine whether two or more of the uplink data flow requests for which the application monitoring engine 118 determined, at operation 210, characteristics should be bundled. The method 300 described below with reference to FIG. 3 provides example operations that can be performed by the selecting bundling decision engine 120 at operation 212. From operation 212, the method 200 proceeds to operation 214, where the method 200 may end.

Turning now to FIG. 3, a flow diagram illustrating aspects of a method 300 for dynamic bundling of uplink data sessions based upon network signaling conditions and application interactivity states will be described, according to an illustrative embodiment. The method 300 is described from the perspective of the mobile device 102 executing, via one or more processors, the selective bundling decision engine 120. As such, the method 300 is described with additional reference to FIG. 1.

The method 300 begins and proceeds to operation 302, where the mobile device 102 receives an uplink data flow request from one of the applications 116. From operation 302, the method 300 proceeds to operation 304, where the mobile device 102 determines, based upon the signaling load information 106 included in the cell broadcast message 104, whether the cell 110 is congested. If the mobile device 102 determines that the cell 110 is not congested, the method 300 proceeds to operation 306. At operation 306, the mobile device 102 sends the uplink data flow request to the base station 108. From operation 306, the method 300 proceeds to operation 308, where the method 300 may end.

If, however, the mobile device 102 determines, at operation 304, that the cell 110 is congested, the method 300 proceeds to operation 310, where the mobile device 102 determines whether the application that provided the uplink data flow request is interactive. If the mobile device 102 determines that the application is interactive, the method 300 proceeds to operation 306. At operation 306, the mobile device 102 sends the uplink data flow request to the base station 108. From operation 306, the method 300 proceeds to operation 308, where the method 300 may end. If, however, the mobile device 102 determines, at operation 310, that the application is not interactive, the method 300 proceeds to operation 312. At operation 312, the mobile device 102 sends the uplink data flow request to a bundle cache. Also at operation 312, the mobile device 102 initiates a bundle timer for the bundle cache.

From operation 312, the method 300 proceeds to operation 314, where the mobile device 102 determines whether the bundle timer has expired. If the mobile device 102 determines that the bundle timer has expired, the method 300 proceeds to operation 316. At operation 316, the mobile device 102 resets the bundle timer. From operation 316, the method 300 proceeds to operation 306, where the mobile device 102 sends the uplink data flow request to the base station 108. From operation 306, the method 300 proceeds to operation 308, where the method 300 may end.

If, however, the mobile device 102 determines, at operation 314, that the bundle timer has not expired, the method 300 proceeds to operation 318. At operation 318, the mobile device 102 determines whether a new user request has been received. In some embodiments, the new user request can include any input provided by a user. In some other embodiments, one or more types of user requests can be flagged for resetting the bundle timer. In these embodiments, if a new user request is received but the new user request is not one of the flagged user request types, then the method 300 can proceed as if no new user request has been received. If the mobile device 102 determines, at operation 318, that a new user request has been received, the method 300 proceeds to operation 316. At operation 316, the mobile device 102 resets the bundle timer. From operation 316, the method 300 proceeds to operation 306, where the mobile device 102 sends the uplink data flow request to the base station 108. From operation 306, the method 300 proceeds to operation 308, where the method 300 may end.

If, however, the mobile device 102 determines, at operation 318, that a new user request has not been received, the method 300 proceeds to operation 320. At operation 320, the mobile device 102 sends the uplink bundle 122, including the uplink data flow request and any additional uplink data flow requests available in the bundle cache, to the base station 108. From operation 320, the method 300 proceeds to operation 308, where the method 300 may end.

Figure 4:
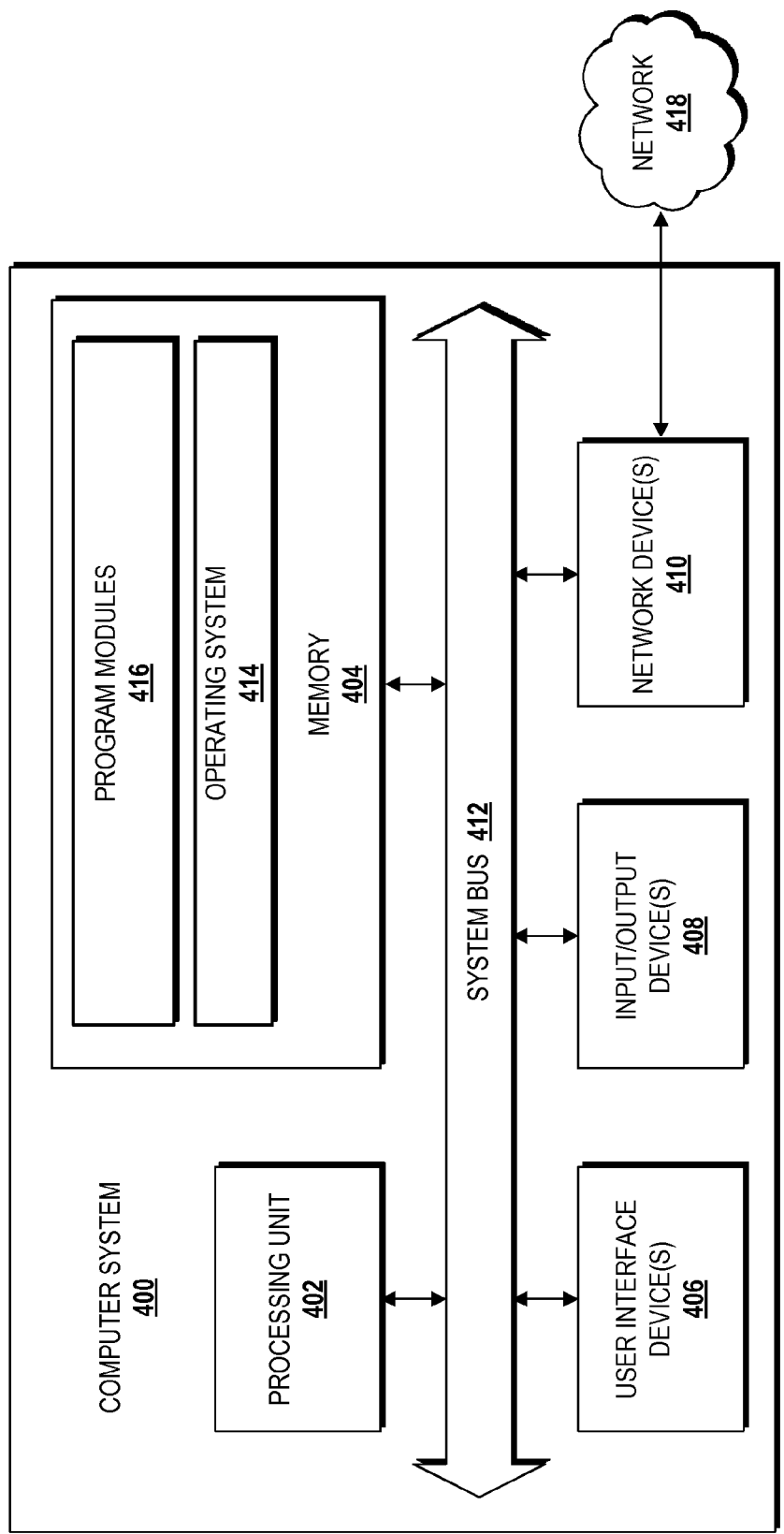
FIG. 4 is a block diagram illustrating an example computer system capable of implementing aspects of the embodiments presented herein.

FIG. 4 is a block diagram illustrating a computer system 400 configured to provide the functionality in accordance with various embodiments of the concepts and technologies disclosed herein. In some implementations, the mobile device 102 and/or the base station 108 can utilize an architecture that is the same as or similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 can include the application(s) 116, the application monitoring engine 118, and/or the selective bundling decision engine 120 in embodiments that the mobile device 102 is configured like the computer system 400. The program modules 416 and/or other programs can be embodied in computer-readable media containing instructions that, when executed by the processing unit 402, perform one or more of the methods 200, 300, or at least a portion thereof, described in detail above with respect to FIGS. 2 and 3. According to embodiments, the program modules 416 may be embodied in hardware, software, firmware, or any combination thereof. Although not shown in FIG. 4, it should be understood that the memory 404 also can be configured to store the cell broadcast message 104, the signaling load information 106, one or more bundle caches, the uplink bundle 122, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418, which can include at least one base station such as the base station 108 and at least one cell such as the cell 110. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 418 may be a wired network such as, but not limited to, a wide area network ("WAN"), a wired LAN such as provided via Ethernet, a wired personal area network n ("PAN"), or a wired metropolitan area network ("MAN").

Figure 5:
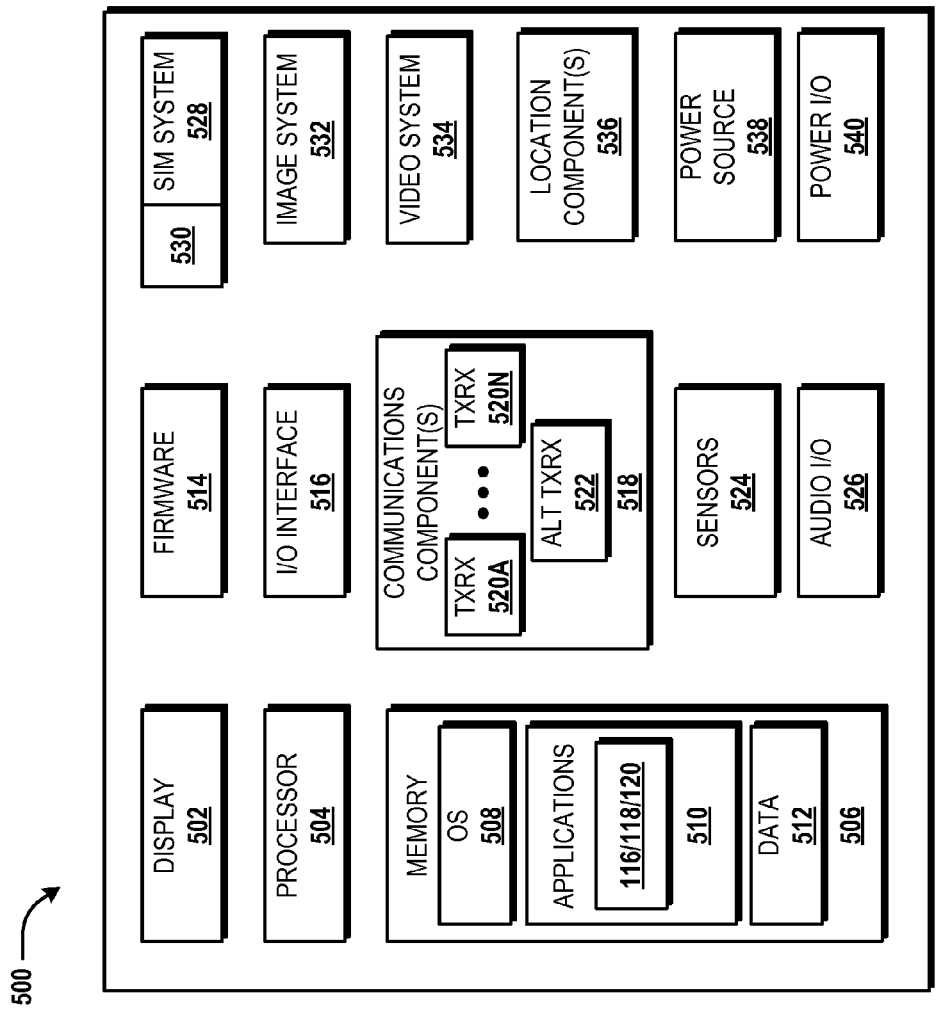
FIG. 5 is a block diagram illustrating an example mobile device capable of implementing aspects of the embodiments disclosed herein.

Turning now to FIG. 5, an illustrative mobile device 500 and components thereof will be described. In some embodiments, the mobile device 102 described above with reference to FIG. 1 can be configured as and/or can have an architecture similar or identical to the mobile device 500 described herein in FIG. 5. It should be understood, however, that the mobile device 102 may or may not include the functionality described herein with reference to FIG. 5. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508 (e.g., the operating system 114), one or more applications 510 (e.g., the application(s) 116, the application monitoring engine 118, and the selective bundling decision engine 120), other computer-executable instructions stored in a memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, the cell broadcast message 104, the signaling load information 106, one or more bundle caches, the uplink bundle 122, and/or other data, if desired.

According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks described above herein. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA, CDMAONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), NFC, other RF technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from GPS devices, A-GPS devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
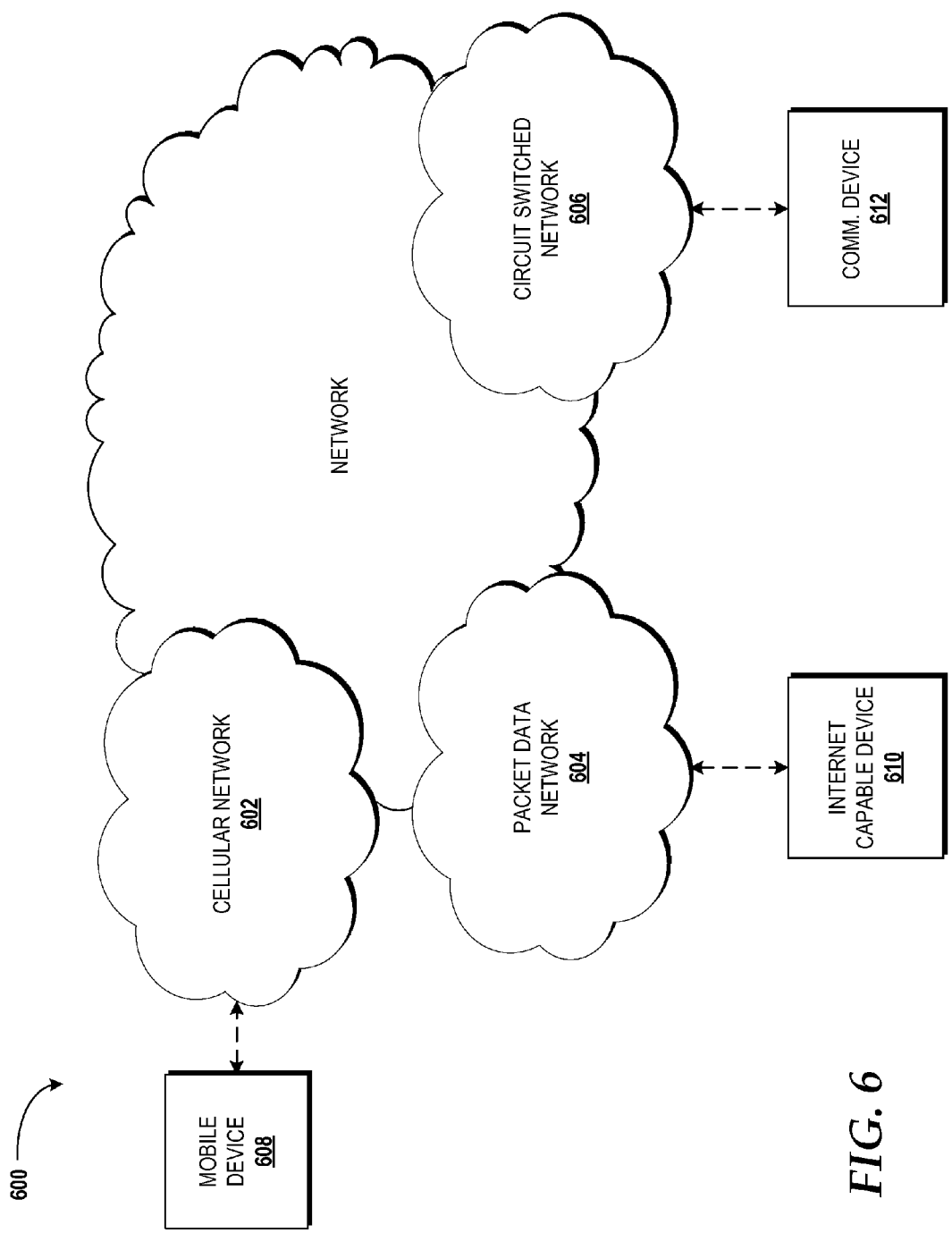
FIG. 6 schematically illustrates a network, according to an illustrative embodiment.

Turning now to FIG. 6, additional details of a network 600 are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, BTSs, Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606. In some embodiments, the cellular network 602 includes the base station 108 and the cell 110.

A mobile communications device 608, such as, for example, a cellular telephone, a user equipment, a mobile terminal, a PDA, a laptop computer, a handheld computer, the mobile device 102, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the mobile device 102, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, the mobile device 102, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies directed to dynamic bundling of uplink data sessions based upon network signaling conditions and application interactivity states have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:

receiving, by a mobile device comprising a processor, a cell broadcast message from a base station, the cell broadcast message comprising signaling load information indicating utilization of physical uplink and downlink control channels of the base station according to a percentage of time the physical uplink and downlink control channels are idle over a specified time interval;

determining, by the mobile device, a characteristic of an uplink data flow request;

determining, by the mobile device, whether the signaling load information of the cell broadcast message from the base station indicates that a cell associated with the base station is congested;

when the signaling load information of the cell broadcast message from the base station indicates that the cell associated with the base station is congested, determining, by the mobile device, whether the characteristic of the uplink data flow request indicates that an application associated with the uplink data flow request is interactive or non-interactive;

determining, by the mobile device, whether the uplink data flow request should be bundled based, at least in part, upon whether the characteristic of the uplink data flow request is determined to indicate that the application associated with the uplink data flow request is interactive or non-interactive, wherein determining whether the uplink data flow request should be bundled based, at least in part, upon whether the characteristic of the uplink data flow request is determined to indicate that the application associated with the uplink data flow request is interactive or non-interactive comprises determining, by the mobile device, that the uplink data flow request should be bundled if the characteristic of the uplink data flow request is determined to indicate that the application associated with the uplink data flow request is non-interactive; and sending, by the mobile device, to the base station, the uplink data flow request in an uplink bundle comprising a further uplink data flow request.

2. The method of claim 1, wherein the signaling load information comprises historic network signaling load information and current network signaling load information.

3. The method of claim 1, wherein the cell broadcast message comprises a system information block.

4. The method of claim 1, wherein the cell broadcast message comprises a short messaging service message.

5. The method of claim 1, wherein the characteristic of the uplink data flow request comprises a state of an input/output device of the mobile device.

6. The method of claim 1, wherein determining, by the mobile device, whether the uplink data flow request should be bundled based, at least in part, upon whether the characteristic of the uplink data flow request is determined to indicate that the application associated with the uplink data flow request is interactive or non-interactive comprises determining, by the mobile device, that the uplink data flow request should not be bundled if the characteristic of the uplink data flow request is determined to indicate that the application associated with the uplink data flow request is interactive.

7. The method of claim 1, further comprising: in response to determining that the uplink data flow request should be bundled, sending, by the mobile device, the uplink data flow request to a bundle cache, and initiating a bundle timer, wherein the bundle timer can be set based at least in part on quality of service parameters;

determining, by the mobile device, whether the bundle timer has expired;

if the bundle timer has expired, resetting, by the mobile device, the bundle timer, and sending the uplink data flow request to the base station;

if the bundle timer has not expired, determining whether a new user request has been received;

if a new user request has not been received, sending, by the mobile device, to the base station, the uplink bundle comprising the uplink data flow request and the further uplink data flow request included in the bundle cache; and if a new user request has been received, resetting, by the mobile device, the bundle timer, and sending the uplink data flow request to the base station.

8. A mobile device comprising:

a processor; and a memory comprising computer-executable instructions that, when executed by the processor, cause the mobile device to perform operations comprising:

receiving a cell broadcast message from a base station, the cell broadcast message comprising signaling load information indicating utilization of physical uplink and downlink control channels of the base station according to a percentage of time the physical uplink and downlink control channels are idle over a specified time interval, determining a characteristic of an uplink data flow request, determining whether the signaling load information of the cell broadcast message from the base station indicates that a cell associated with the base station is congested, when the signaling load information of the cell broadcast message from the base station indicates that the cell associated with the base station is congested, determining whether the characteristic of the uplink data flow request indicates that an application associated with the uplink data flow request is interactive or non-interactive, determining whether the uplink data flow request should be bundled based, at least in part, upon whether the characteristic of the uplink data flow request is determined to indicate that the application associated with the uplink data flow request is interactive or non-interactive, wherein determining whether the uplink data flow request should be bundled based, at least in part, upon whether the characteristic of the uplink data flow request is determined to indicate that the application associated with the uplink data flow request is interactive or non-interactive comprises determining that the uplink data flow request should be bundled if the characteristic of the uplink data flow request is determined to indicate that the application associated with the uplink data flow request is non-interactive, and sending, to the base station, the uplink data flow request in an uplink bundle comprising a further uplink data flow request.

9. The mobile device of claim 8, wherein the characteristic of the uplink data flow request comprises a state of an input/output device of the mobile device.

10. The mobile device of claim 8, wherein determining whether the uplink data flow request should be bundled based, at least in part, upon whether the characteristic of the uplink data flow request is determined to indicate that the application associated with the uplink data flow request is interactive or non-interactive comprises determining that the uplink data flow request should not be bundled if the characteristic of the uplink data flow request is determined to indicate that the application associated with the uplink data flow request is interactive.

11. The mobile device of claim 8, wherein the operations further comprise:

in response to determining that the uplink data flow request should be bundled, sending the uplink data flow request to a bundle cache, and initiating a bundle timer, wherein the bundle timer can be set based at least in part on quality of service parameters;

determining whether the bundle timer has expired; if the bundle timer has expired, resetting the bundle timer, and sending the uplink data flow request to the base station;

if the bundle timer has not expired, determining whether a new user request has been received; if a new user request has not been received, sending the uplink bundle comprising the uplink data flow request and the further uplink data flow request included in the bundle cache to the base station; and if a new user request has been received, resetting the bundle timer, and sending the uplink data flow request to the base station.

12. A computer-readable storage medium comprising computer-executable instructions that, when executed by a processor of a mobile device, cause the mobile device to perform operations comprising:

receiving a cell broadcast message from a base station, the cell broadcast message comprising signaling load information indicating utilization of physical uplink and downlink control channels of the base station according to a percentage of time the physical uplink and downlink control channels are idle over a specified time interval;

determining a characteristic of an uplink data flow request;

determining whether the signaling load information of the cell broadcast message from the base station indicates that a cell associated with the base station is congested;

when the signaling load information of the cell broadcast message from the base station indicates that the cell associated with the base station is congested, determining whether the characteristic of the uplink data flow request indicates that an application associated with the uplink data flow request is interactive or non-interactive;

determining whether the uplink data flow request should be bundled based, at least in part, upon whether the characteristic of the uplink data flow request is determined to indicate that the application associated with the uplink data flow request is interactive or non-interactive, wherein determining whether the uplink data flow request should be bundled based, at least in part, upon whether the characteristic of the uplink data flow request is determined to indicate that the application associated with the uplink data flow request is interactive or non-interactive comprises determining that the uplink data flow request should be bundled if the characteristic of the uplink data flow request is determined to indicate that the application associated with the uplink data flow request is non-interactive; and sending, to the base station, the uplink data flow request in an uplink bundle comprising a further uplink data flow request.

13. The computer-readable storage medium of claim 12, wherein the characteristic of the uplink data flow request comprises a state of an input/output device of the mobile device.

14. The computer-readable storage medium of claim 12, wherein determining whether the uplink data flow request should be bundled based, at least in part, upon whether the characteristic of the uplink data flow request is determined to indicate that the application associated with the uplink data flow request is interactive or non-interactive comprises determining that the uplink data flow request should not be bundled if the characteristic of the uplink data flow request is determined to indicate that the application associated with the uplink data flow request is interactive.

15. The computer-readable storage medium of claim 12, wherein the operations further comprise:

in response to determining that the uplink data flow request should be bundled, sending the uplink data flow request to a bundle cache, and initiating a bundle timer, wherein the bundle timer can be set based at least in part on quality of service parameters;

determining whether the bundle timer has expired;

if the bundle timer has expired, resetting the bundle timer, and sending the uplink data flow request to the base station;

if the bundle timer has not expired, determining whether a new user request has been received, if a new user request has not been received, sending, to the base station, the uplink bundle comprising the uplink data flow request and the further uplink data flow request included in the bundle cache; and if a new user request has been received, resetting the bundle timer, and sending the uplink data flow request to the base station.

* * * * *